(12) United States Patent
Danziger et al.

(10) Patent No.: US 6,377,726 B1
(45) Date of Patent: Apr. 23, 2002

(54) TRANSVERSE MODE TRANSFORMER

(75) Inventors: Yochay Danziger, Rishon le Zion; Ofer Braude, Ramat Gan; Eran Herman, Rishon le Zion, all of (IL)

(73) Assignee: LaserComm Inc., Plano, TX (US)

( * ) Notice: Subject to any disclaimer, the term of this patent is extended or adjusted under 35 U.S.C. 154(b) by 0 days.

(21) Appl. No.: 09/515,959

(22) Filed: Feb. 29, 2000

(51) Int. Cl.[7] .............................. G02B 6/26; G02B 6/14
(52) U.S. Cl. ........................... 385/28; 385/29; 385/140
(58) Field of Search .................... 385/28, 29, 123–128, 385/144, 140; 372/18, 19

(56) References Cited

U.S. PATENT DOCUMENTS

| | | | | |
|---|---|---|---|---|
| 3,891,302 A | * | 6/1975 | Dabby et al. | 385/37 |
| 4,895,421 A | | 1/1990 | Kim et al. | 350/96.15 |
| 4,942,623 A | * | 7/1990 | Asawa et al. | 385/28 |
| 5,185,827 A | * | 2/1993 | Poole | 385/28 |
| 5,311,525 A | | 5/1994 | Pantell et al. | 372/6 |
| 5,760,941 A | | 6/1998 | Young et al. | 359/181 |
| 5,802,234 A | * | 9/1998 | Vengsarkar et al. | 385/123 |
| 6,269,205 B1 | * | 7/2001 | Peral et al. | 385/28 |

OTHER PUBLICATIONS

Geometrical Transformations in Optics, by O. Bryngdahl, published in the Journal of the Optical Society of America, Aug. 1974, (1092–1099).

Optical Coordinate Transformations, by N. Davidson, AA. Friesem and E. Hasman, published in, Applied Optics, Mar. 1992, 31:1067.

* cited by examiner

Primary Examiner—Hemang Sanghavi
Assistant Examiner—Omar Rojas
(74) Attorney, Agent, or Firm—Simon Mark Kahn

(57) ABSTRACT

The invention relates to apparatus and methods for transforming a spatial mode of an optical signal. The apparatus includes an optical phase element for imparting a predetermined spatially selective phase delay to the optical signal, and a mask in optical communication with the optical phase element. The mask, in one embodiment, includes an optically attenuating region disposed in a predetermined spatial pattern. In one aspect of the invention, the optical signal is transformed from a first spatial mode to a second spatial mode. In another aspect of the invention, the mask includes an absorbing material arranged in a predetermined spatial pattern. In yet another aspect of the invention, the mask includes a scattering material arranged in a predetermined spatial pattern. The invention also relates to a method for transforming a spatial mode of an optical signal. The method includes the step of receiving the optical signal having a first spatial mode with an intensity distribution and a phase. The method further includes the steps of selectively spatially attenuating the intensity distribution of the first spatial mode of the optical signal, selectively spatially delaying the phase of the optical signal, and propagating the selectively spatially attenuated and delayed optical signal. The first spatial mode of the optical signal is substantially transformed into a second spatial mode.

23 Claims, 9 Drawing Sheets

TRANSVERSE MODE TRANSFORMER

FIELD OF THE INVENTION

The invention relates to optical communication systems, and more specifically, to devices and methods for selecting spatial modes in optical signals.

BACKGROUND OF THE INVENTION

Optical signals transmitted through an optical communication fiber are subject to chromatic dispersion, which limits the rate at which data can be transmitted between two points. One or more optical fibers having high negative dispersion, known as dispersion compensation fibers (DCFs) can be used to compensate for the dispersion effect of the communication fiber. Methods and apparatus relating to DCFs are described in pending U.S patent application Ser. Nos. 09/249,830, 09/248,969 and 09/249,920, each filed Feb. 12, 1999, whose contents are incorporated herein by reference and which are assigned to the assignee of this application. In one concept disclosed therein, in order to reduce the length of optical fiber necessary for such compensation and to compensate for the dispersion slope, it is desirable to transform the optical signal from a lower order spatial mode (e.g., $LP_{01}$) to a higher order spatial mode (e.g., $LP_{02}$) using a transverse spatial mode transformer before transmitting the optical signal through the DCF. The DCF has been designed to function optimally with a higher order spatial mode. The signal is then transformed back to a lower order spatial mode after exiting the DCF using another transverse spatial mode transformer. The performance of the dispersion compensation device is limited in part by energy lost in unwanted spatial modes resulting from impurities in the compensation fiber, fabrication tolerances in the transverse spatial mode transformers, and alignment of the device with respect to the communication fiber.

Uses for higher order spatial modes include special transmission fibers, such as the one described in pending U.S. Provisional Patent Application 60/121,321 filed Feb. 23, 1999.

The use of optical elements to produce an optical coordinate transformation has been discussed in the prior art. Two exemplary articles include Bryngdahl, O. "Geometrical Transformations in Optics." *Journal of the Optical Society of America* (August 1974):1092–1099., and Davidson, N.; Fresem, A.A.; and Hasman, E. "Optical Coordinate Transformations." *Applied Optics* (March 1992):1067.

U.S. Pat. No. 5,760,941 discloses an optical mask utilized as an amplitude mask, which allows certain spectral frequencies to pass.

U.S. Pat. No. 4,895,421 discloses the use of a mask to attenuate optical energy radiating from one of two lobes of the $LP_{11}$ spatial mode. This acts to assist in the detection of an on or off condition caused by the activation or deactivation of a pump signal.

However none of the above references teach a method for removing unwanted spatial modes remaining, or describe a profile for converting in a bi-directional manner spatial modes existing in an optical waveguide to a different spatial mode existing in another waveguide.

SUMMARY OF THE INVENTION

The invention relates to an apparatus for transforming a spatial mode of an optical signal. The apparatus includes an optical phase element for imparting a predetermined spatially selective phase delay to the optical signal, and a mask in optical communication with the optical phase element. The mask, in one embodiment, includes an optically attenuating region disposed in a predetermined spatial pattern. In another embodiment, the mask is integral with the phase element. In another embodiment, the phase element includes a calcium fluoride window.

The apparatus, in one embodiment, includes an optical element in optical communication with the optical phase element. The optical element can be a lens. In another embodiment, the lens is integral with the optical phase element. In another embodiment, the phase element is in optical communication with an optical waveguide. In still another embodiment, the phase element is in optical communication with a second optical waveguide. The apparatus, in another embodiment, includes an optical element disposed between the optical phase element and the optical waveguide. In still another embodiment, an optical element is disposed between the optical phase element and the second optical waveguide.

In one aspect of the invention, the optical signal is transformed from a first spatial mode to a second spatial mode. The first and second spatial modes, in other embodiments, are the $LP_{01}$ spatial mode or the $LP_{02}$ spatial mode.

In another aspect of the invention, the mask includes an absorbing material arranged in a predetermined spatial pattern. In yet another aspect of the invention, the mask includes a scattering material arranged in a predetermined spatial pattern. In one embodiment, the optically attenuating region includes a sharp profile. In other embodiments, the predetermined spatial pattern is coincident with a minimal energy point of the first or second spatial mode.

The invention also relates to a method for attenuating an undesired spatial mode in an optical mode transformer. The method includes the steps of receiving the optical signal having the undesired spatial mode with an intensity distribution, selectively spatially attenuating the intensity distribution of the undesired spatial mode, and propagating the selectively spatially attenuated optical signal. The undesired spatial mode is substantially removed from the optical signal. In one embodiment, the undesired spatial mode is the $LP_{01}$ spatial mode. In another embodiment, the undesired spatial mode is the $LP_{02}$ spatial mode.

The invention further relates to a method for transforming a spatial mode of an optical signal. The method includes the step of receiving the optical signal having a first spatial mode with an intensity distribution and a phase. The method further includes the steps of selectively spatially attenuating the intensity distribution of the first spatial mode of the optical signal, selectively spatially delaying the phase of the optical signal, and propagating the selectively spatially attenuated and delayed optical signal. The first spatial mode of the optical signal is substantially transformed into a second spatial mode. In other embodiments, the first and second spatial modes are the $LP_{01}$ spatial mode or the $LP_{02}$ spatial mode.

BRIEF DESCRIPTION OF THE DRAWINGS

This invention is pointed out with particularity in the appended claims. The above and further advantages of this invention may be better understood by referring to the following description taking in conjunction with the accompanying drawings, in which:

DETAILED DESCRIPTION

The invention relates to a device for performing a transverse mode transformation of light energy from one spatial mode substantially completely to another spatial mode, while removing any undesired spatial modes. The device removes uncontrolled effects caused by aberration in the elements or misalignment and ellipticity from an optical signal, while maintaining a desired spatial mode. In one embodiment the device includes a mask having at least one absorbing region or one scattering region disposed in a low intensity region of the desired spatial mode. The mask attenuates energy in the low intensity region of the desired spatial mode. The degree of attenuation for each spatial mode is dependent on the spatial mode's cross-sectional intensity distribution with respect to the features of the absorbing mask. In another embodiment, the device includes a sharp transition at the end of one or more masks to scatter undesired energy.

Figure 1:
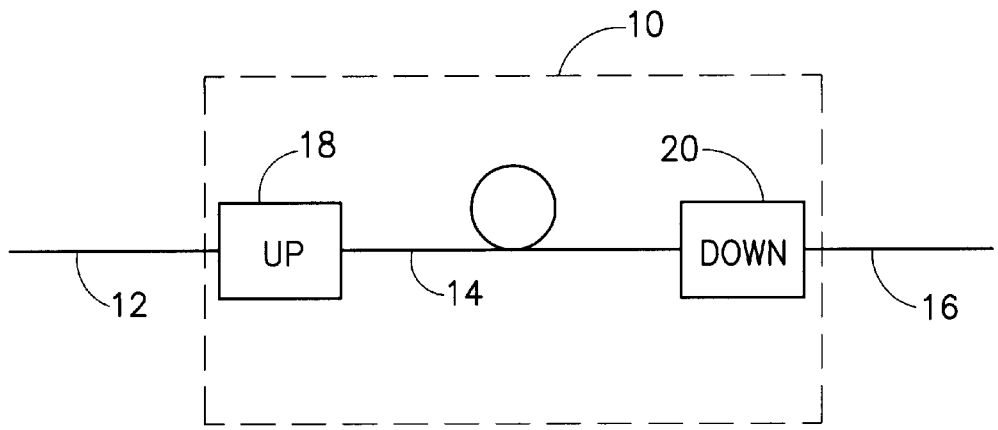
FIG. 1 illustrates one embodiment of a dispersion compensation device according to the present invention.

FIG. 1 shows a block diagram of a dispersion compensation device 10 used to compensate for chromatic dispersion in communication optical fibers 12 and 16. A spatial mode transformer 18 transforms substantially all of the energy from the $LP_{01}$ spatial mode of the signal in the first communication fiber 12 into higher order spatial mode ($LP_{02}$) utilized in a dispersion compensation fiber 14. A second spatial mode transformer 20 transforms substantially all of the energy from the higher spatial order mode back to the $LP_{01}$ spatial mode for transmission through the second communication fiber 16.

The description of the transformation is described below as being in the direction of converting $LP_{01}$ to the $LP_{02}$ spatial mode. It is to be understood that the elements can be designed to function in a bi-directional fashion by coordinate transformation, by numerical iterations, by a combination of these methods or any other method, with the same principles applied for converting the $LP_{02}$ spatial mode to the $LP_{01}$ spatial mode. The invention is described in relation to a specific higher order spatial mode, namely the $LP_{02}$ spatial mode, and a specific lower order spatial mode, namely the $LP_{01}$ spatial mode. However, this is not intended to be limiting in any way. In other embodiments, the invention is used to convert between any two or more spatial modes. The description of the transformation is described below in connection with one embodiment of a dispersion compensation management device. In other embodiments, the invention is utilized without a second device for retransformation to the original spatial mode, or for example, in combination with a transmission fiber as described in pending U.S. Provisional Patent Application 60/121,321.

Figure 2:
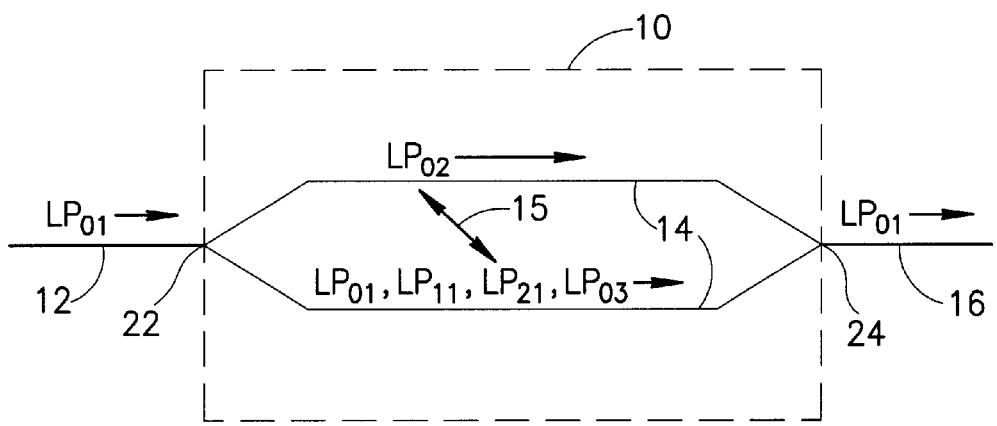
FIG. 2 is a functional diagram of one embodiment of the dispersion compensation device shown in FIG. 1.

FIG. 2 is a functional diagram of one embodiment of the device 10 of FIG. 1 indicating the coupling mechanism between two spatial modes. Splitters 22 and 24 represent spatial mode coupling at the spatial mode transformers 18 and 20, respectively. After transformation, the dispersion compensation fiber 14 includes both the desired $LP_{02}$ spatial mode and unwanted spatial modes $LP_{01}$, $LP_{11}$, $LP_{21}$, and $LP_{03}$, which are shown traveling in separate paths in dispersion compensation fiber 14. It is to be understood, however, that both paths exist in the single dispersion compensation fiber 14, and interactions between the desired and undesired spatial modes shown as arrow 15, and known as multipath interference (MPI), cause significant reduction in signal quality. Thus, it is desirable to implement a method for filtering out the unwanted spatial modes and aberrations resulting from the coupling, especially at the spatial mode transformers 18 and 20 of FIG. 1.

Figure 3:
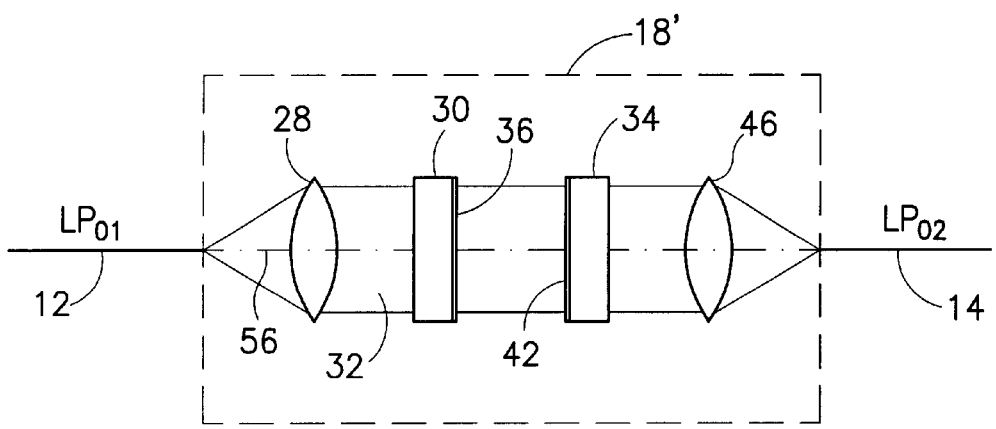
FIG. 3 illustrates one embodiment of a mode transformer constructed according to the present invention.

FIG. 3 depicts one embodiment of a spatial mode transformer 18' for efficiently transforming the $LP_{01}$ spatial mode to the $LP_{02}$ spatial mode while suppressing other undesired spatial modes from entering dispersion compensation fiber 14. In this embodiment, the spatial mode transformer 18' includes a lens 28 for collimating the optical output of the single mode fiber (SMF) 12, a pair of phase elements 30 and 34 which selectively spatially delay the collimated beam 32 in one or more predetermined regions to cause a transformation from the $LP_{01}$ spatial mode to the $LP_{02}$ spatial mode, and a coupling lens 46 for transmitting the optical energy into a dispersion compensation fiber 14. It is to be understood that the $LP_{01}$ and $LP_{02}$ spatial modes do not physically exist outside of the optical waveguide, however the field distribution, which is similar to these spatial modes is meant. Phase elements 30 and 34 are produced from any appropriate optical material, including but not limited to a calcium fluoride ($CaF_2$) window. In additional embodiments, lens 28 and lens 46 are physically combined with phase element 30 and 34, respectively. Mask 36, in one embodiment, is shown substantially attached to phase element 30. In another embodiment, mask 36 is not attached to phase element 30 (not shown). Mask 36 attenuates selected spatial modes in collimated beam 32. Mask 42, in one embodiment, is shown substantially attached to phase element 34. In another embodiment, mask 42 is not attached to phase element 34 (not shown). Mask 42 attenuates selected spatial modes in collimated beam 32. Embodiments of masks 36 and 42 will be described in greater detail.

Figure 4:
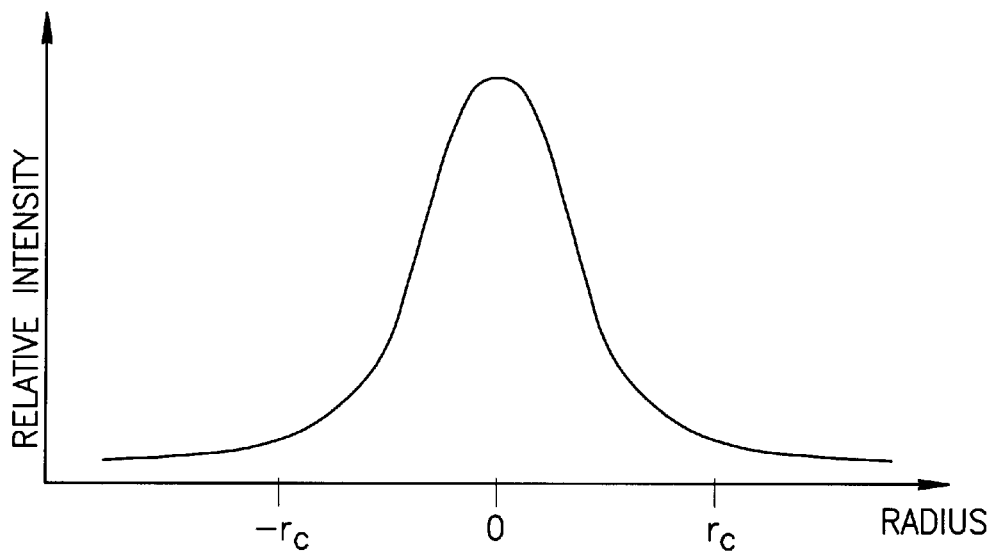
FIG. 4 illustrates the radial intensity distribution of the $LP_{01}$ spatial mode in an optical beam.

FIG. 4 depicts the radial intensity distribution of the desired $LP_{01}$ spatial mode at the first phase element 30. There is negligible optical energy under the curve where the radius is greater than $r_c$. Therefore, nearly all of the energy exists inside a radius $r_c$. By introducing an absorbing or scattering mask which has high absorption or scattering in the area with radius greater than $r_c$, spatial modes or spurious energies in this area are significantly attenuated and the attenuation of the $LP_{01}$ spatial mode is negligible.

Figure 5A:
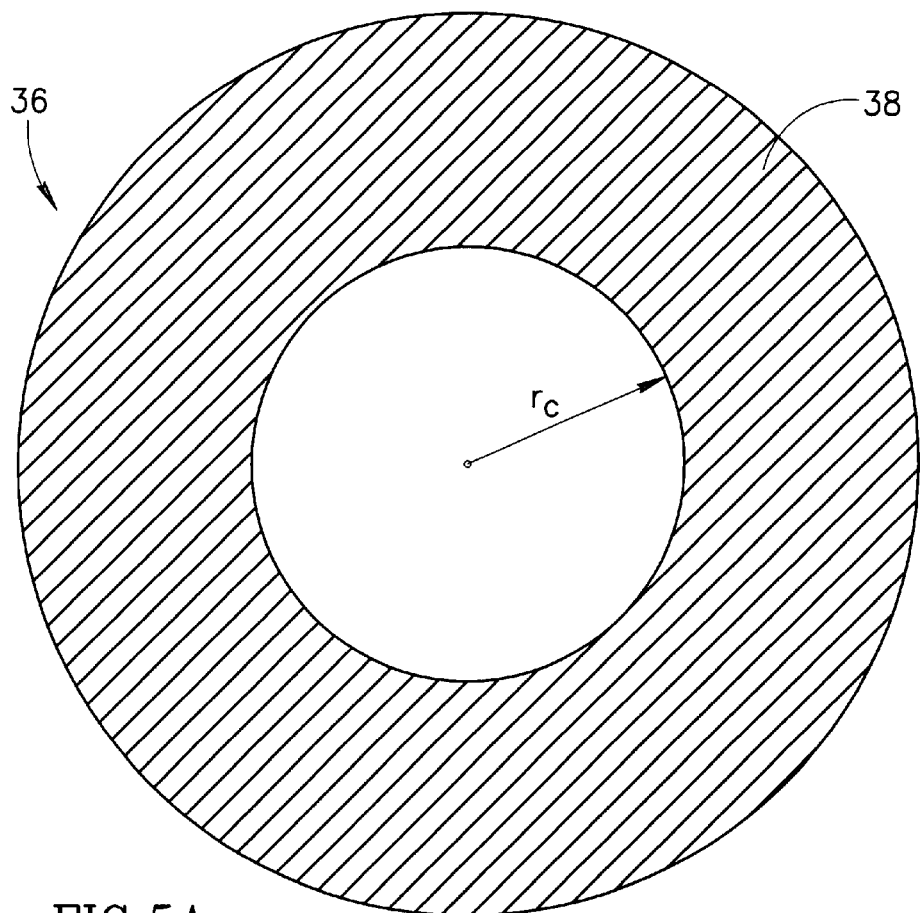
FIGS. 5a and 5b illustrate embodiments of an absorbing mask and a scattering mask, respectively, according to the present invention.

FIG. 5a shows an absorbing mask 36 located on or near the first phase element 30 having an absorbing region 38 which has no significant influence on the desired $LP_{01}$ spatial mode but can substantially attenuate modes with energy outside a radius $r_c$. In another embodiment of the invention, an absorbing material can be integrated into the phase element 30.

Figure 5B:
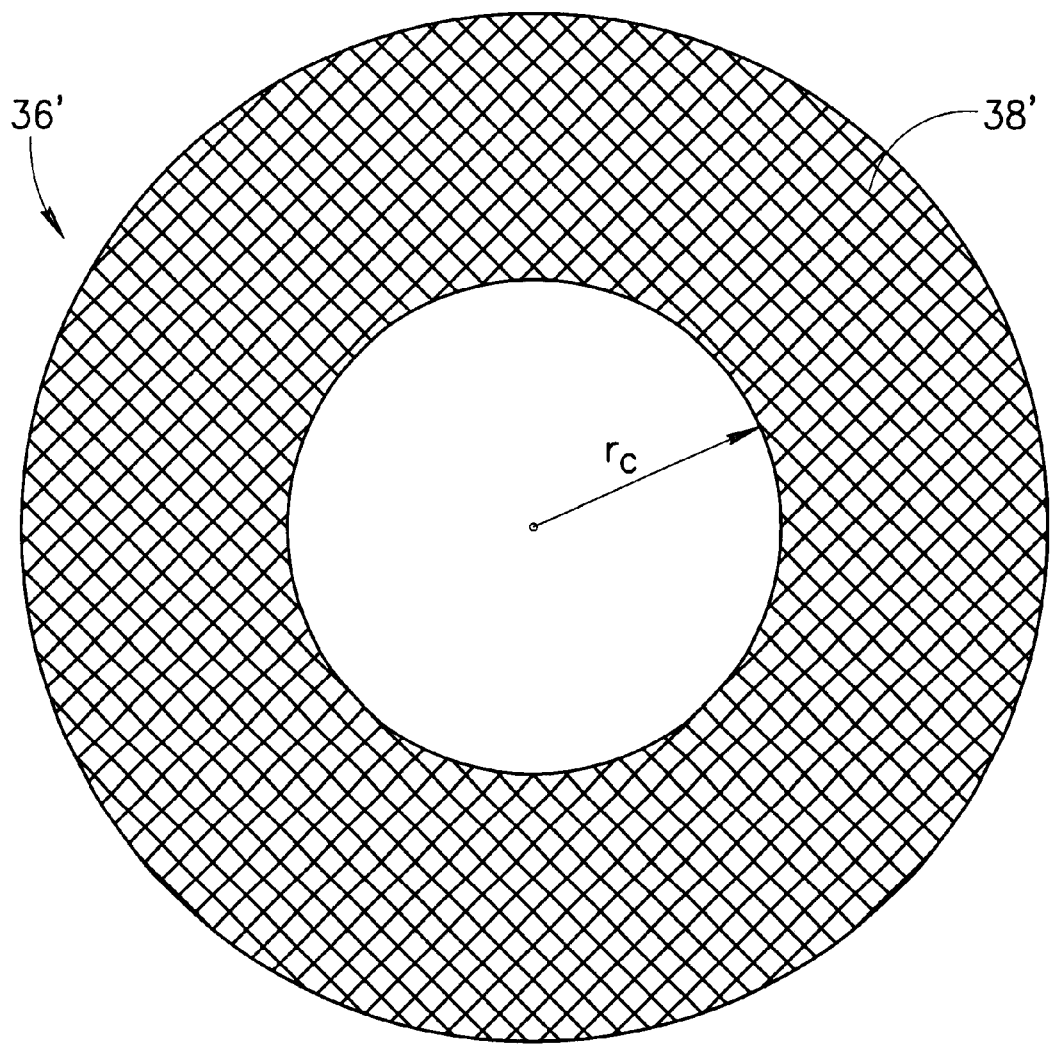

FIG. 5b shows a scattering mask 36' located on or near the first phase element 30 having a scattering region 38' which also includes a surface profile having a sharp pattern for scattering a substantial portion of the optical energy in region 38' out of the optical path. The region 38' has no significant influence on the desired $LP_{01}$ spatial mode. The surface profile, in one embodiment, is part of the surface profile of the phase element 30. Both absorbing mask 36 and scattering mask 36' can be placed on either side of phase element 30, and can be used together if desired.

Figure 6:
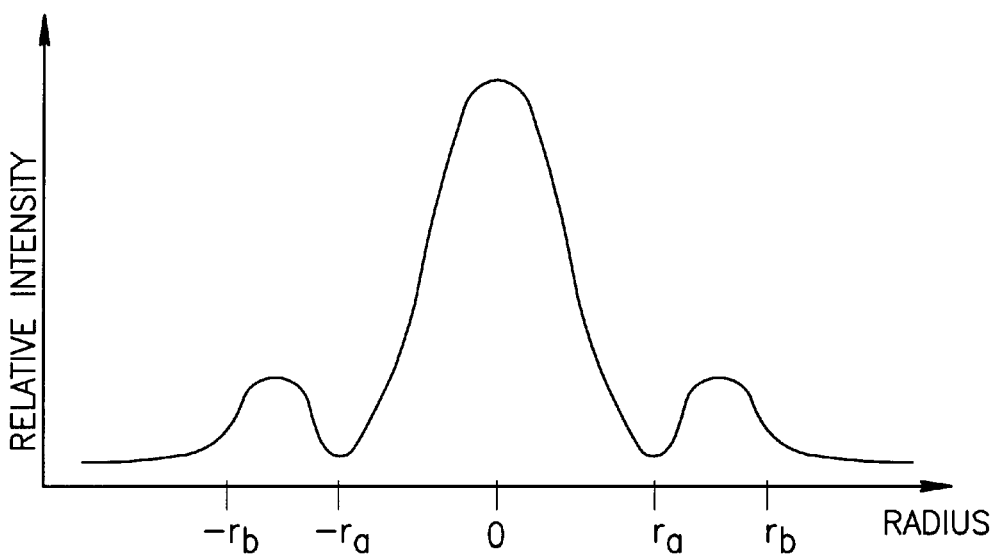
FIG. 6 illustrates the radial intensity distribution of the $LP_{02}$ spatial mode in an optical beam.

FIG. 6 depicts the desired radial intensity distribution of the $LP_{02}$ spatial mode at the output of second phase element 34. There is negligible optical energy in the cross-sectional areas 44 where the radius is approximately $r_a$. Similarly, there is negligible optical energy in the cross-sectional area 46 whose radius is greater than $r_b$. By introducing an absorbing mask or a phase element profile which has high absorption or scattering in areas 44 and 46, spatial modes having significant energy in areas 44 and 46 are significantly attenuated while the attenuation of the $LP_{02}$ spatial mode is negligible.

Figure 7A:
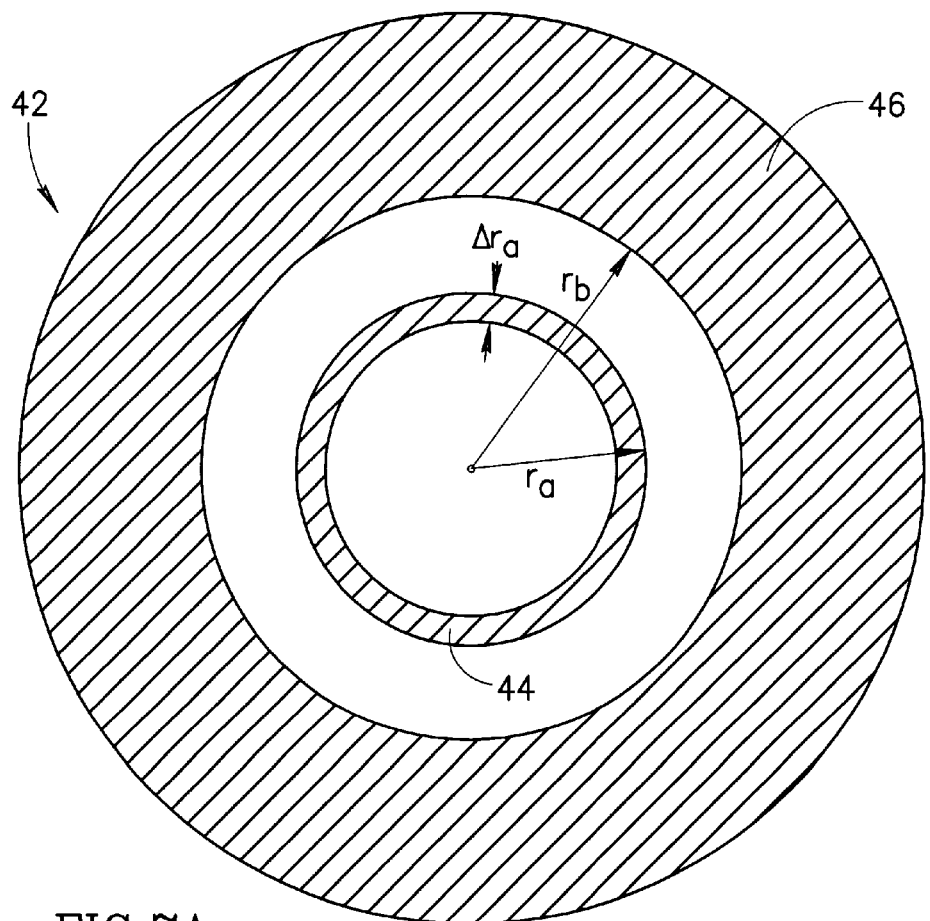
FIGS. 7a and 7b illustrate embodiments of an absorbing mask and a scattering mask, respectively, according to the present invention.

FIG. 7a depicts the front view of an absorbing mask 42 located on or near the second phase element 34 having an absorbing ring 44 and an outer absorbing region 46. The rejection of unwanted spatial modes is improved as the width $\Delta r_a$ of the absorbing ring 44 is increased. Unfortunately, the desired spatial mode is also attenuated as the width $\Delta r_a$ increases. As a result, the width $\Delta r_a$ of the absorbing ring is typically limited by the acceptable attenuation loss (e.g., 0.2 dB or less) to the desired spatial mode. Outer absorbing ring 46 rejects unwanted energy, which can consist of errors in the transformation caused by inexactitude in the elements or their placement, as well as undesired modal energies. In one embodiment, absorbing ring 44 and absorbing ring 46 are constructed of an absorbing material. In one embodiment, phase elements 30 and 34 are produced by surface relief methods, such as diamond turning or photolithography. Integrating an absorbing material into the phase elements 30 and 34 requires implementation of an additional process and results in increased fabrication time and cost.

Figure 7B:
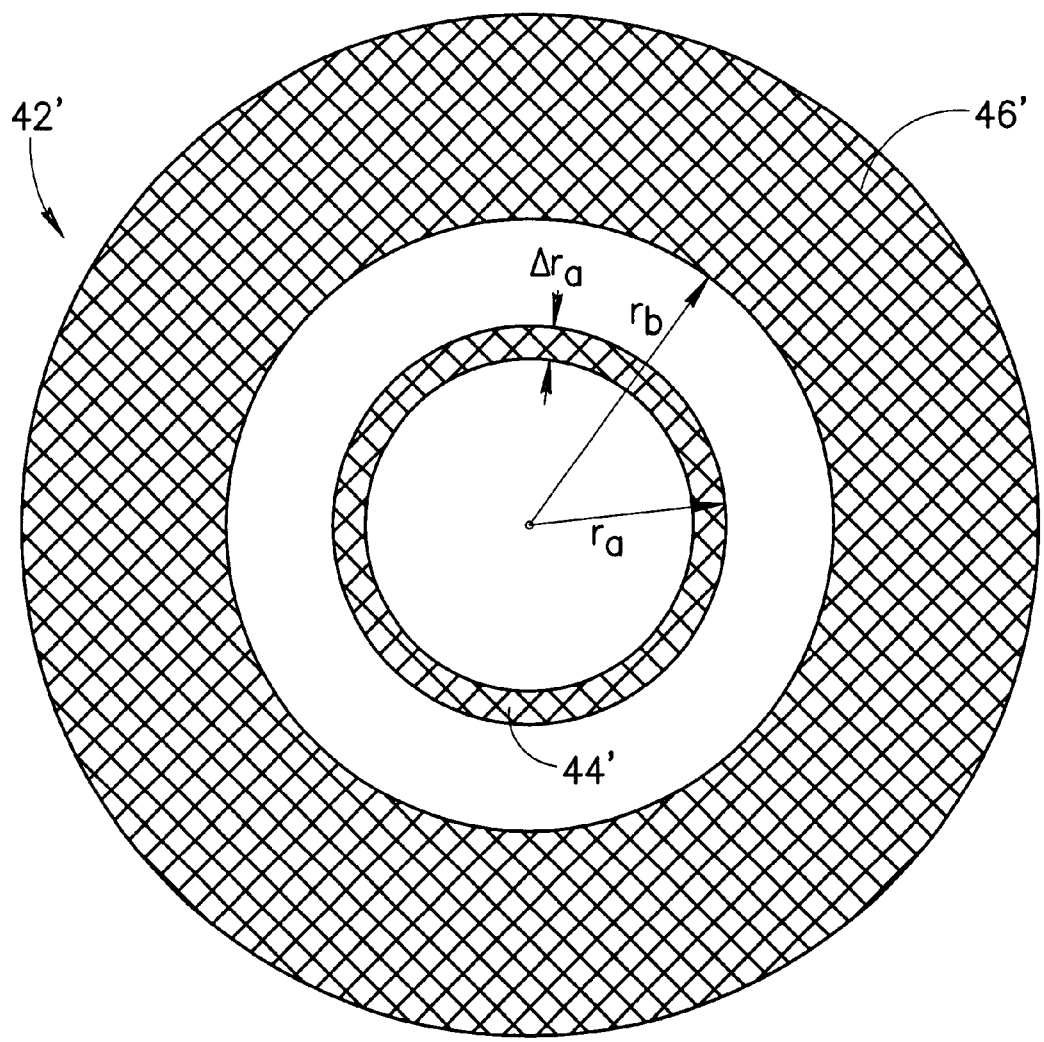

FIG. 7b shows mask 42', which has high loss in scattering regions 44' and 46'. These loss regions 44' and 46' include a sharp change in the surface profile, which scatters most of the optical energy in the regions 44' and 46' out of the optical path. Mask 42' can, in different embodiments, be near, on, or substantially part of the surface profile of second phase element 34. The rejection of unwanted spatial modes is improved as the width $\Delta r_a$ of the scattering ring 44' is increased. Unfortunately, the desired spatial mode is also attenuated as the width $\Delta r_a$ increases. As a result, the width $\Delta r_a$ of the scattering ring is typically limited by the acceptable attenuation loss (e.g., 0.2 dB or less) to the desired spatial mode. Outer scattering ring 46' rejects unwanted energy which can consist of errors in the transformation caused by inexactitude in the elements or their placement, as well as undesired modal energies. Construction of a narrow sharp profile in the middle of a phase element requires a complex manufacturing process, whereas constructing a sharp profile at a radial section proceeding towards the outer limit of an element is, typically, more easily achieved.

It is to be understood that absorbing ring 44 can be combined on a single element with scattering ring 46', or absorbing ring 46 with scattering ring 44'. In addition absorbing ring 46 or scattering ring 46' can be utilized without absorbing ring 44 or scattering ring 44' to achieve selectivity. Conversely, absorbing ring 44 or scattering ring 44' can be utilized without absorbing ring 46 or scattering ring 46'. Furthermore, rings 46, 46', 44 and 44' can each be placed on, near or as part of either side of second phase element 34. Absorbing ring 44, in another embodiment, is used in combination with scattering ring 44'. In yet another embodiment, absorbing ring 46 is used in combination with scattering ring 46'.

By integrating the two absorbing masks 36 and 42, or scattering masks 36' and 42' or any combination of the masks, with their respective phase elements 30 and 34, a spatial mode transformer 18 having significant mode selectivity is realized. In addition, the spatial mode transformer 18 has reduced sensitivity to variations and distortions of the phase elements 30 and 34. Thus, noise due to interference caused by undesired spatial modes, uncontrolled energy at the ends, aberrations in the elements, misalignment and any ellipticity is minimized. It is to be understood that mask 36, 36', 42 or 42' can also be used alone to achieve significant mode selectivity.

In one embodiment, the absorbing masks 36 and 42 are partially absorbing. The absorption varies spatially according to a predetermined mode selectivity. In another embodiment, the absorption is replaced by random phase distortion (i.e., optical diffusion) in the absorbing regions 38, 44 and 46. The absorbing masks can be implemented in other spatial mode transformers having any number of optical phase elements.

Figure 8A:
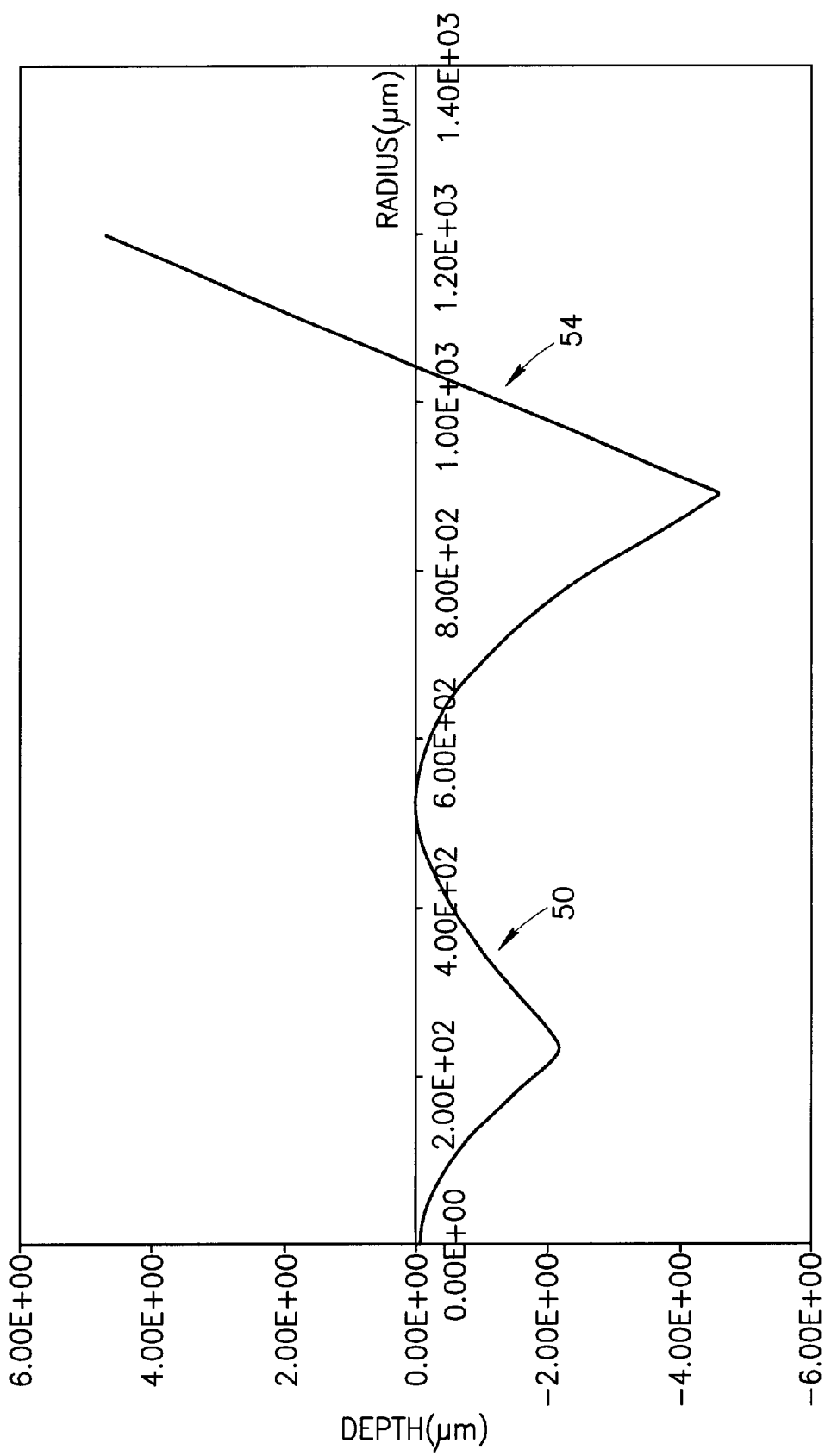
FIGS. 8a illustrates one embodiment of the radial profile of a first phase element according to the present invention.

Referring to FIG. 8a, therein is shown a graph of surface profile 50 of phase element 30 of FIG. 3. One embodiment of mask 38' of FIG. 5b is also shown as scattering profile 54. The X-axis represents the radial distance in microns of the phase element, and the Y-axis represents the depth in microns. The fixed portion of the phase element is not shown for clarity. The profile is designed as part of a system to convert the energy from one spatial mode, for example, the $LP_{01}$ spatial mode, to a second spatial mode, for example, the $LP_{02}$ spatial mode, for transmission into a dispersion compensation fiber. The surface profile 50 of phase element 30 is designed to operate in combination with second phase element 34 of FIG. 3, which is typically at a distance on the order of the Rayleigh range, and preferably less than the Rayleigh range to complete the conversion between spatial modes with very high efficiency. The exact profile is a function of the actual $LP_{02}$ spatial mode cross sectional profile of dispersion compensation fiber 14, the actual $LP_{01}$ spatial mode cross sectional profile of single mode fiber (SMF) 16, the distances between the elements, and the exact profile of the collimating lenses. Once the above factors are known, the exact profile is chosen in a manner known to those skilled in the art so as to steer the energy from the input spatial mode to the desired output spatial mode. This is accomplished by analytic coordinate transformation, by an iterative numerical process, by a combination of these processes, or by any other method known to those skilled in the art.

Figure 8B:
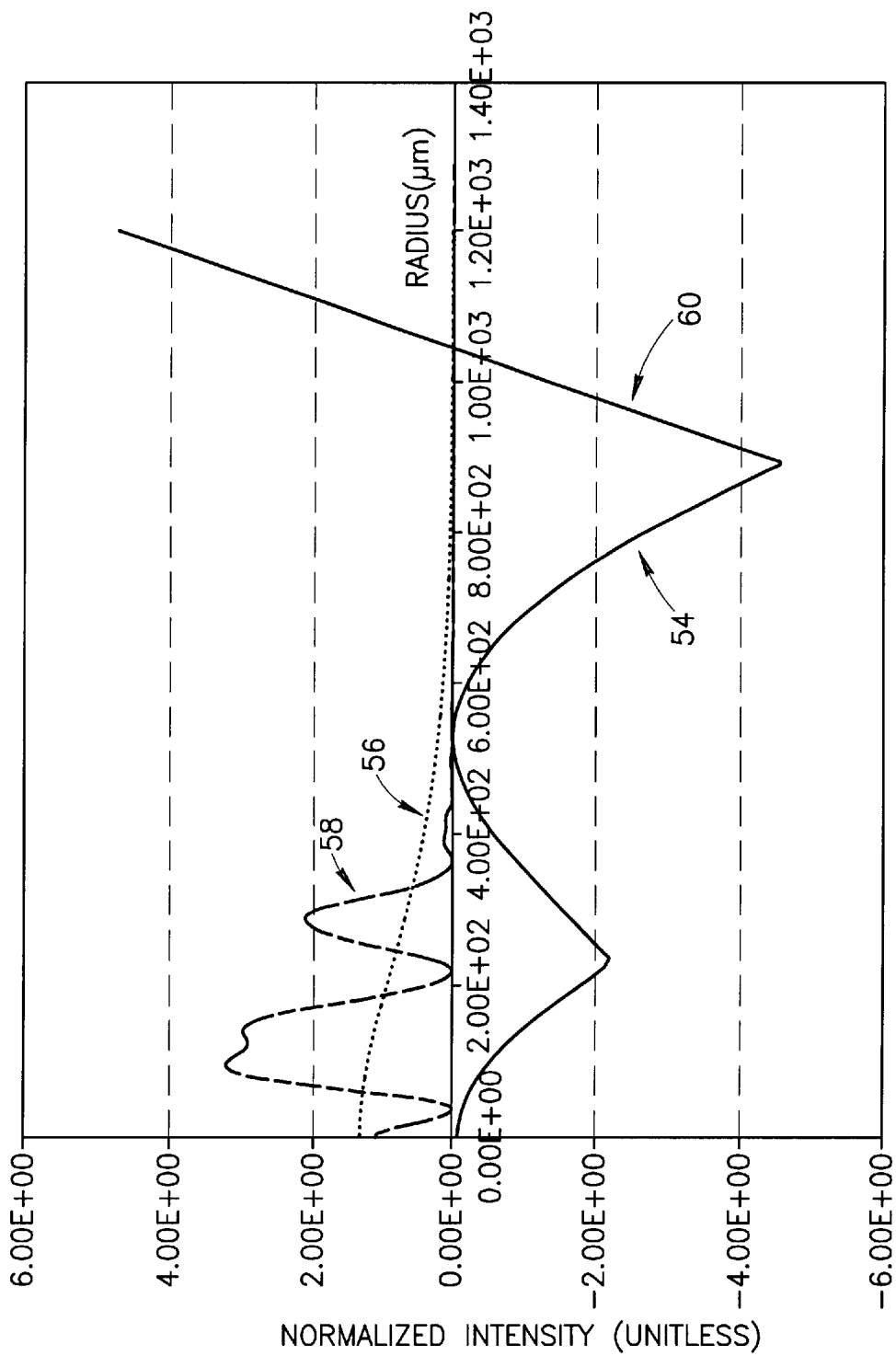
FIG. 8b illustrates the normalized energy intensity of the desired and undesired energy in combination with the radial profile of a first phase element according to the present invention.

Referring now to FIG. 8b, therein is shown a graph of the normalized energy intensity superimposed on the phase element 30. It should be noted that the Y-axis of the graph in FIG. 8b is a mixture of both normalized energy intensity and depth of the lens used, and the X-axis represents the lens radius. Curve 58 represents undesired energy, which will be reshaped and directed by the shape of the element, line 54 represents the profile of element 30, and line 56 represents energy of the desired spatial mode. It should be noted that curves 56 and 58 are independently normalized and do not represent similar energy levels. Since the input spatial mode is the $LP_{01}$ spatial mode, which as mentioned above can be the output of the transformer in reverse operation, a sharp change 60 in profile is constructed towards the outer part of the lens, at a point where the $LP_{01}$ spatial mode has relatively low energy. The effect of the sharp change 60 in profile is to scatter all optical energy located in the area of the sharp change 60. Scattering in this region is useful to compensate for misalignment of the optical elements as well as any ellipticity in the fibers, and is primarily functions to eliminate uncontrolled energy. In one embodiment, the technique of sharply changing the profile to scatter the energy could be used as an alternative to using a scattering or absorbing mask as depicted in FIG. 5a.

Figure 9A:
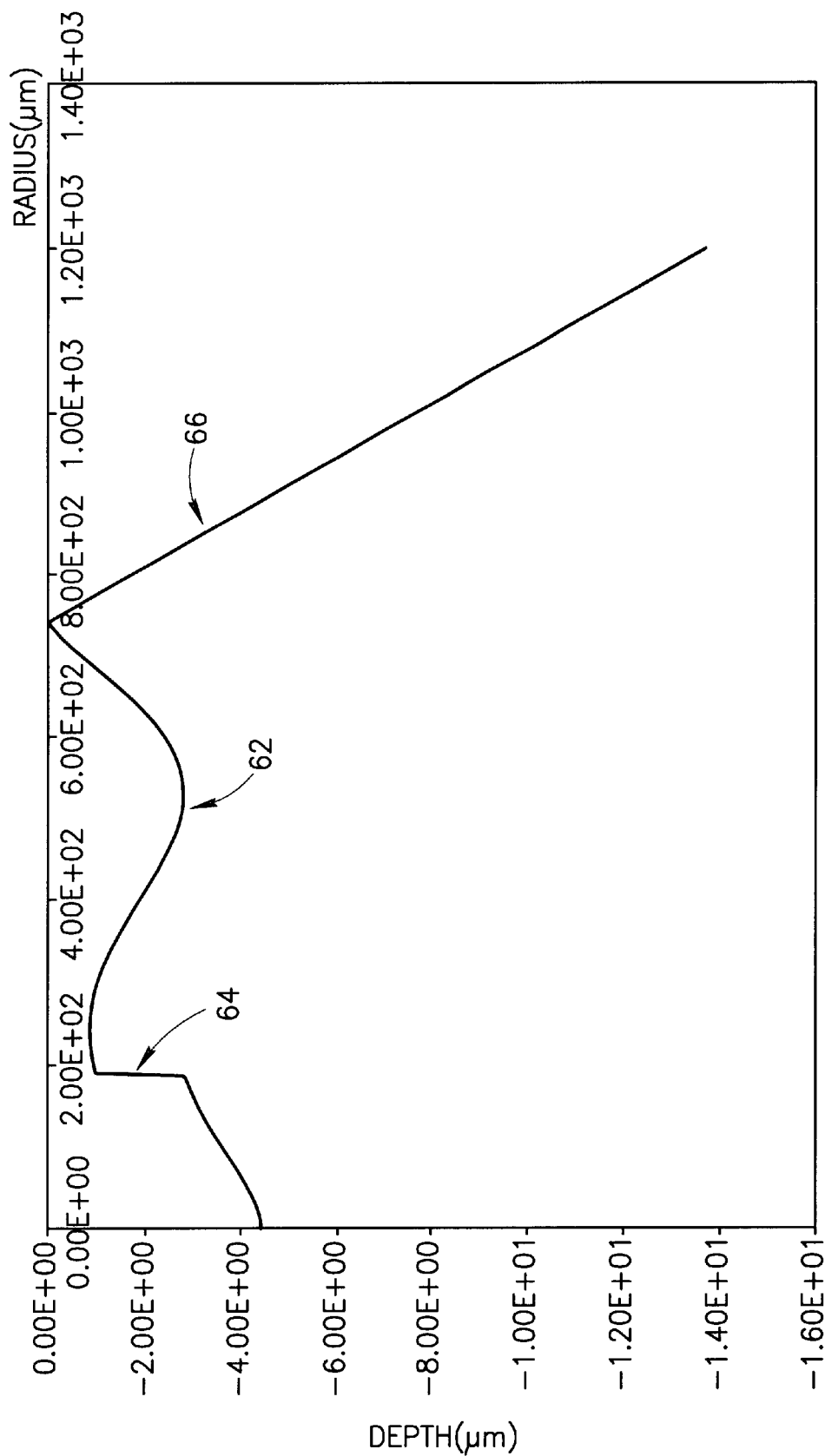
FIG. 9a illustrates one embodiment of the radial profile of a second phase element according to the present invention.

FIG. 9a shows a graph of one embodiment of a surface profile of phase element 34 FIG. 3. The X-axis represents the radial distance in microns of the phase element, and the Y-axis represents the depth in microns. The fixed portion of the phase element is not shown for clarity. The profile 62 of second phase change element is shown with a sharp discontinuity 64, which causes the phase shift described in the aforementioned pending applications. The sharp profile 66 represents mask 46' of FIG. 7b, while the remainder of profile 62 functions to complete the steering of energy to the desired $LP_{02}$ spatial mode at the output of phase element 34. The energy is focused by optical element 46 into dispersion compensating fiber 14. In the reverse direction, optical element 46 collimates the optical energy received from dispersion compensating fiber 14.

Figure 9B:
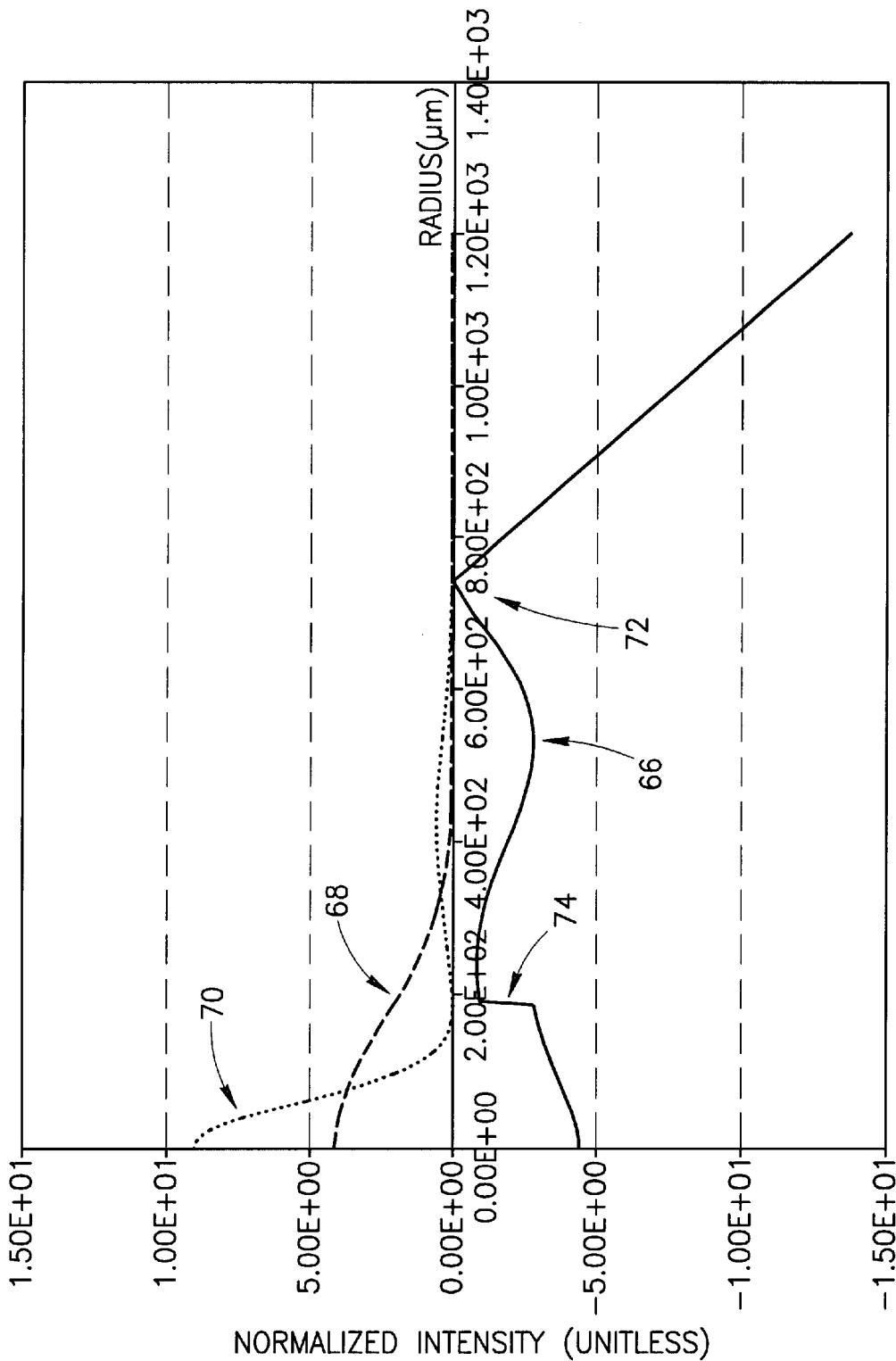
FIG. 9b illustrates the normalized energy intensity of the desired and undesired energy in combination with the radial profile of a second phase element according to the present invention.

Referring now to FIG. 9b, therein is shown a graph of the energy superimposed on the phase element 34. It should be noted that the Y-axis of the graph in FIG. 12 is a mixture of both normalized energy intensity and the depth of the lens used. The X-axis represents the radius. Curve 66 represents the phase element profile. Curve 70 represents the desired energy in the $LP_{02}$ spatial mode, and curve 68 represents the undesired energy primarily in the $LP_{01}$ spatial mode. It should be noted that curves 68 and 70 are independently normalized and do not represent similar energy levels. Since the output spatial mode is the $LP_{02}$ spatial mode, which as mentioned above can be the input of the transformer in reverse operation, a sharp change 72 in profile is constructed towards the outer part of the lens, at a point where the undesired mode intensity is relatively low. The effect of the sharp change 72 in profile is to scatter all optical energy located in the area of the sharp change 72. Scattering in this region is useful to compensate for misalignment of the optical elements as well as any ellipticity in the fibers, and is primarily functions to eliminate uncontrolled energy. In one embodiment, it is possible to avoid the use of masks such as depicted in FIG. 7a, and instead use sharp profile changes to scatter the light energy. It is to be noted that ring 44 or 44' are not shown in FIG. 9b. Phase element discontinuity 74 functions to introduce a step function to the wavefront such that the center region of the wavefront is retarded with respect to the outer region of the wavefront.

Having described and shown the preferred embodiments of the invention, it will now become apparent to one of skill in the art that other embodiments incorporating the concepts may be used and that many variations are possible which will still be within the scope and spirit of the claimed invention. It is felt, therefore, that these embodiments should not be limited to disclosed embodiments but rather should be limited only by the spirit and scope of the following claims.

What is claimed is:

1. An apparatus for transforming an optical signal propagating in a first unique spatial mode into a second unique spatial mode comprising:
    an optical phase element arranged to impart a predetermined spatially selective phase delay to at least one region of the optical signal, providing a modified optical signal; and
    a mask in optical communication with said optical phase element, said mask having an optically attenuating region disposed in a predetermined spatial pattern at a location whereat said modified optical signal has minimal energy,
    whereby said modified optical signal propagates in substantially the single second unique spatial mode.

2. The apparatus of claim 1 wherein said mask is integral with said optical phase element.

3. The apparatus of claim 1 further comprising an optical element in optical communication with said optical phase element.

4. The apparatus of claim 3 wherein said optical element comprises a lens.

5. The apparatus of claim 1 further comprising an optical waveguide in optical communication with said optical phase element.

6. The apparatus of claim 5 further comprising a second optical waveguide in optical communication with said optical phase element.

7. The apparatus of claim 5 further comprising an optical element disposed between said optical phase element and said optical waveguide.

8. The apparatus of claim 6 further comprising an optical element disposed between said optical phase element and said second optical waveguide.

9. The apparatus of claim 1 wherein the first unique spatial mode of said optical signal is the $LP_{01}$ mode and said second unique spatial mode is the $LP_{02}$ mode.

10. The apparatus of claim 1 wherein the first unique spatial mode of said optical signal is the $LP_{02}$ mode and said second unique spatial mode is the $LP_{01}$ mode.

11. The apparatus of claim 4 wherein said lens is integral with said optical phase element.

12. The apparatus of claim 1 wherein said optical phase element comprises a calcium fluoride window.

13. The apparatus of claim 1 wherein said mask comprises an absorbing material in a predetermined spatial pattern.

14. The apparatus of claim 1 wherein said mask comprises a scattering material in a predetermined spatial pattern.

15. The apparatus of claim 1 wherein said mask comprises a sharp profile.

16. The apparatus of claim 9 wherein said predetermined spatial pattern is coincident with a minimal energy point of said second spatial mode.

17. The apparatus of claim 10 wherein said predetermined spatial pattern is coincident with a minimal energy point of said first spatial mode.

18. A method for transforming an optical signal propagating in a first unique spatial mode into a second unique spatial mode, said method comprising the steps of:
    providing an optical phase element arranged to impart a predetermined spatially selective phase delay to at least one region of the optical signal;
    providing a mask in optical communication with said optical phase element, said mask having an optically attenuating region disposed in predetermined spatial pattern at a location wherein said optical signal has minimal energy;

directing the optical signal to propagate in interchangeable order through said phase element and said mask, said phase element spatially altering the phase of at least one region of said optical signal, said mask selectively spatially attenuating said intensity distribution of said optical signal, thereby developing a modified optical signal, said modified optical signal being substantially transformed into a second unique spatial mode.

19. The method of claim 18 wherein the first unique spatial mode of said optical signal is the $LP_{01}$ mode and said second unique spatial mode is the $LP_{02}$ mode.

20. The apparatus of claim 18 wherein the first unique spatial mode of said optical signal is the $LP_{02}$ mode and said second unique spatial mode is the $LP_{01}$ mode.

21. The apparatus of claim 9 wherein sad predetermined spatial pattern is coincident with a minimal energy point of said first spatial mode.

22. The apparatus of claim 10 wherein said predetermined spatial pattern is coincident with a minimal energy point of said second spatial monde.

23. The method of claim 18 wherein said mask comprises a sharp profile.

* * * * *